(12) United States Patent
Cohen

(10) Patent No.: US 6,406,300 B1
(45) Date of Patent: Jun. 18, 2002

(54) BOARD GAME TEACHING LETTER LOCATIONS ON A KEYBOARD

(76) Inventor: Rhoda Cohen, 2621 Haring St., Brooklyn, NY (US) 11235

( * ) Notice: Subject to any disclaimer, the term of this patent is extended or adjusted under 35 U.S.C. 154(b) by 16 days.

(21) Appl. No.: 09/637,667

(22) Filed: Aug. 14, 2000

(51) Int. Cl.⁷ .............................................. G09B 13/00
(52) U.S. Cl. ...................... 434/227; 446/143; 273/236; 273/280; 273/141 R; 273/142 R
(58) Field of Search .......................... 273/236; 434/128, 434/129, 227–233, 334–339, 156–178; 446/143

(56) References Cited

U.S. PATENT DOCUMENTS

| | | | | |
|---|---|---|---|---|
| 1,558,083 A | * | 10/1925 | Gittnes ........................ | 273/236 |
| 2,962,819 A | * | 12/1960 | Kerridge ..................... | 434/228 |
| 3,334,422 A | * | 8/1967 | Little .......................... | 273/357 |
| 4,275,443 A | * | 6/1981 | Sorin ...................... | 273/148 R |
| 4,358,278 A | * | 11/1982 | Goldfarb .................... | 434/169 |
| 4,895,374 A | * | 1/1990 | Bowles ........................ | 273/249 |
| 5,088,928 A | * | 2/1992 | Chan ........................... | 273/237 |
| 5,655,910 A | * | 8/1997 | Troudet ....................... | 434/233 |
| 5,823,782 A | * | 10/1998 | Marcus et al. .............. | 434/156 |

* cited by examiner

Primary Examiner—Derris H. Banks
Assistant Examiner—George F Hufnagel
(74) Attorney, Agent, or Firm—Goldstein Law Offices, PC

(57) ABSTRACT

A board game teaching letter locations on a keyboard including a first game board and a second game board. The upper surface of the first game board has a spinning wheel, a computer keyboard, and a pair of hand placement markers disposed thereon. The lower surface has a rotatable base secured thereto. The second game board has a path of travel defined by a starting location, a finishing location, and a plurality of spaces. The plurality of spaces are represented by letters of the alphabet in order. The second game board has a question card marker thereon. The spelling cards each have a category including related words to be spelled. A plurality of tokens are provided which represent players for movement along the path of travel of the second game board.

2 Claims, 3 Drawing Sheets

BOARD GAME TEACHING LETTER LOCATIONS ON A KEYBOARD

BACKGROUND OF THE INVENTION

The present invention relates to a board game teaching letter locations on a keyboard and more particularly pertains to allowing a child to learn the positioning of letters on a keyboard in the form of a game.

The use of games for amusement and educational purposes is known in the prior art. More specifically, games for amusement and educational purposes heretofore devised and utilized for the purpose of teaching children while they play a game are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,895,374 to Bowles discloses a board game for teaching students the relationship between lines and spaces with the keys on a keyboard. U.S. Pat. No. 5,823,782 to Marcus discloses an educational system for teaching spelling and mathematics. U.S. Pat. No. 5,088,928 to Chan discloses an educational board game comprised of questions and answers. U.S. Pat. No. 4,275,443 to Sorin discloses a board game using a computing device.

While these devices fulfill their respective, particular objective and requirements, the aforementioned patents do not describe a board game teaching letter locations on a keyboard for allowing a child to learn the positioning of letters on a keyboard in the form of a game.

In this respect, the board game teaching letter locations on a keyboard according to the present invention substantially departs from the conventional concepts and designs of the prior art, and in doing so provides an apparatus primarily developed for the purpose of allowing a child to learn the positioning of letters on a keyboard in the form of a game.

Therefore, it can be appreciated that there exists a continuing need for a new and improved board game teaching letter locations on a keyboard which can be used for allowing a child to learn the positioning of letters on a keyboard in the form of a game. In this regard, the present invention substantially fulfills this need.

SUMMARY OF THE INVENTION

In the view of the foregoing disadvantages inherent in the known types of games for amusement and educational purposes now present in the prior art, the present invention provides an improved board game teaching letter locations on a keyboard. As such, the general purpose of the present invention, which will be described subsequently in greater detail, is to provide a new and improved board game teaching letter locations on a keyboard which has all the advantages of the prior art and none of the disadvantages.

To attain this, the present invention essentially comprises a first game board having a generally square configuration. The first game board has an upper surface and a lower surface. The upper surface has a spinning wheel disposed thereon. The upper surface has a computer keyboard printed thereon. The upper surface has a pair of hand placement markers disposed thereon adjacent to the computer keyboard. The lower surface has a rotatable base secured thereto. A second game board is provided having a generally rectangular configuration. The second game board has a path of travel thereon. The path of travel is defined by a starting location, a finishing location, and a plurality of spaces therebetween. The plurality of spaces are represented by letters of the alphabet in order. The second game board has a question card marker thereon. A plurality of groupings of spelling cards are provided that are positionable on the question card marker of the second game board. The spelling cards each have a category. The category includes related words to be spelled. A plurality of tokens are provided which represent players for movement along the path of travel of the second game board.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved board game teaching letter locations on a keyboard which has all the advantages of the prior art games for amusement and educational purposes and none of the disadvantages.

It is another object of the present invention to provide a new and improved board game teaching letter locations on a keyboard which may be easily and efficiently manufactured and marketed.

It is a further object of the present invention to provide a new and improved board game teaching letter locations on a keyboard which is of durable and reliable construction.

An even further object of the present invention is to provide a new and improved board game teaching letter locations on a keyboard which is susceptible of a low cost of manufacture with regard to both materials and labor, and which accordingly is then susceptible of low prices of sale to the consuming public, thereby making such a board game teaching letter locations on a keyboard economically available to the buying public.

Even still another object of the present invention is to provide a new and improved board game teaching letter locations on a keyboard for allowing a child to learn the positioning of letters on a keyboard in the form of a game.

Lastly, it is an object of the present invention to provide a new and improved board game teaching letter locations on a keyboard including a first game board having a generally square configuration. The first game board has an upper surface and a lower surface. The upper surface has a spinning wheel disposed thereon. The upper surface has a computer keyboard printed thereon. The upper surface has a pair of hand placement markers disposed thereon adjacent to the computer keyboard. The lower surface has a rotatable base secured thereto. A second game board is provided having a generally rectangular configuration. The second game board has a path of travel thereon. The path of travel is defined by a starting location, a finishing location, and a plurality of spaces therebetween. The plurality of spaces are represented by letters of the alphabet in order. The second game board has a question card marker thereon. A plurality of groupings of spelling cards are provided that are positionable on the question card marker of the second game board. The spelling cards each have a category. The category includes related words to be spelled. A plurality of tokens are provided which represent players for movement along the path of travel of the second game board.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
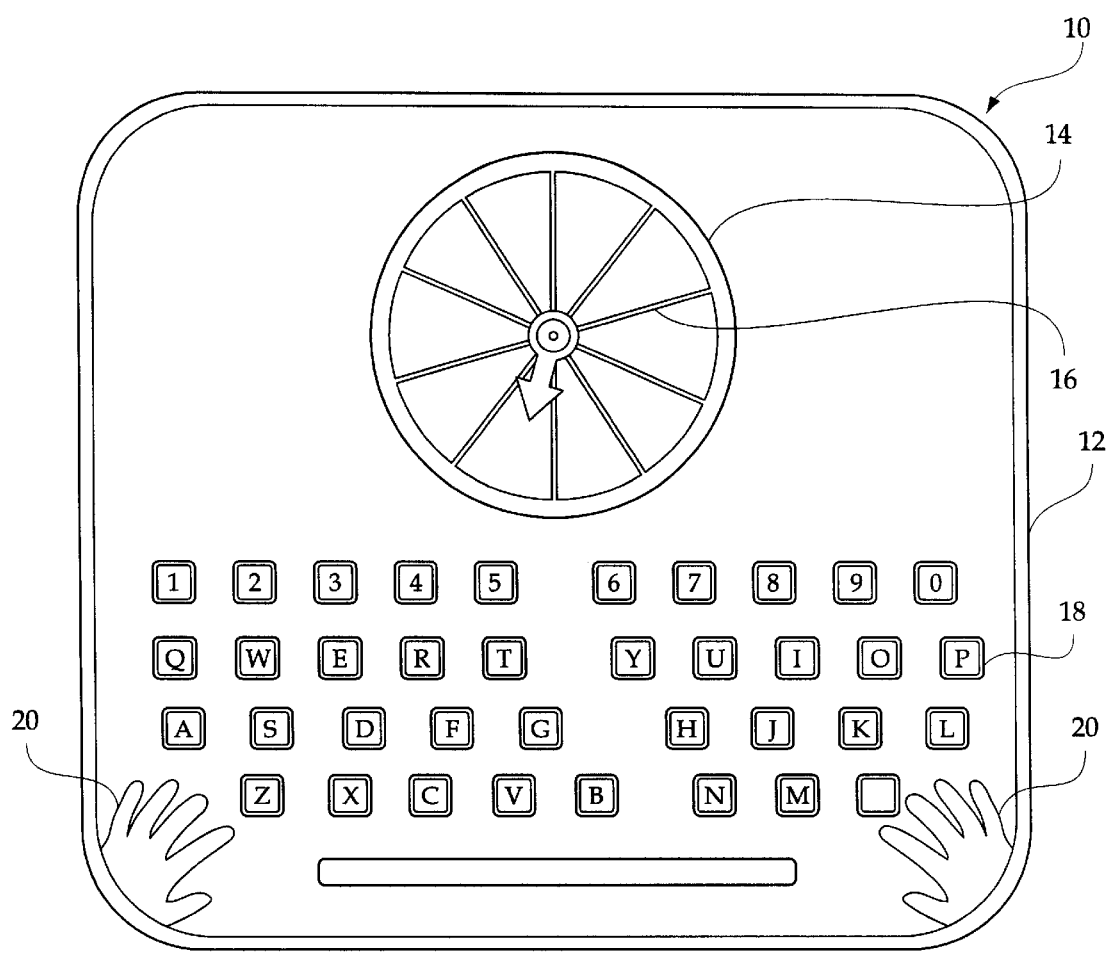
FIG. 1 is a perspective view of the preferred embodiment of the board game teaching letter locations on a keyboard constructed in accordance with the principles of the present invention.
Figure 2:
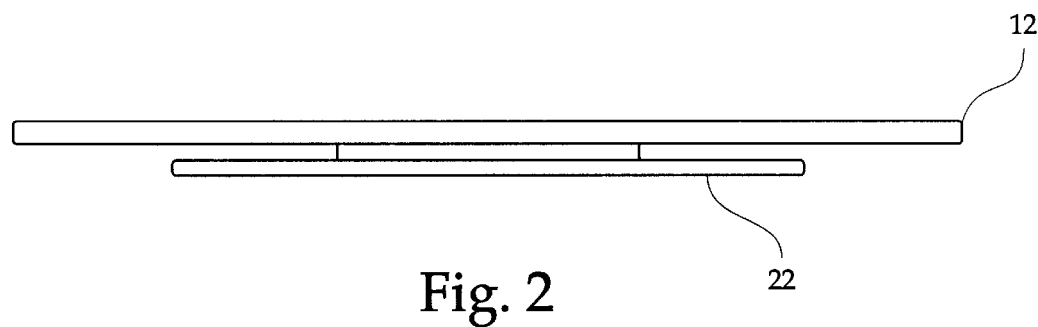
FIG. 2 is a side view of the first game board of the present invention.

With reference now to the drawings, and in particular, to FIGS. 1 through 4 thereof, the preferred embodiment of the new and improved board game teaching letter locations on a keyboard embodying the principles and concepts of the present invention and generally designated by the reference number 10 will be described.

Specifically, it will be noted in the various figures that the device relates to a board game teaching letter locations on a keyboard for allowing a child to learn the positioning of letters on a keyboard in the form of a game. The game is designed for use in conjunction with a QWERTY keyboard, said keyboard having a well known format used by common English typewriters and computers alike. In its broadest context, the device consists of a first game board, a second game board, a plurality of groupings of spelling cards, and a plurality of tokens. Such components are individually configured and correlated with respect to each other so as to attain the desired objective.

The first game board 12 has a generally square configuration. The first game board 12 has an upper surface and a lower surface. The upper surface has a spinning wheel 14 disposed thereon. The spinning wheel has ten numbered spaces 16 numbered from 1 to 10 thereon. The numbers from 6 to 9 are each marked with a different color. The upper surface has a computer keyboard 18 printed thereon. The upper surface has a pair of hand placement markers 20 disposed thereon adjacent to the computer keyboard 18. The lower surface has a rotatable base 22 secured thereto. The rotatable base 22 allows the first game board 12 to be properly positioned in front of an active player.

The second game board 24 has a generally rectangular configuration. The second game board 24 has a path of travel thereon. The path of travel is defined by a starting location 26, a finishing location 28, and a plurality of spaces 30 therebetween. The plurality of spaces 30 are represented by letters of the alphabet in order. The starting location 26 is next to the letter "A" and the finishing location 28 is next to the letter "Z". The second game board 24 has a question card marker 32 thereon. Each player can be provided with his own second game board 24 to mark his score.

Figure 3:
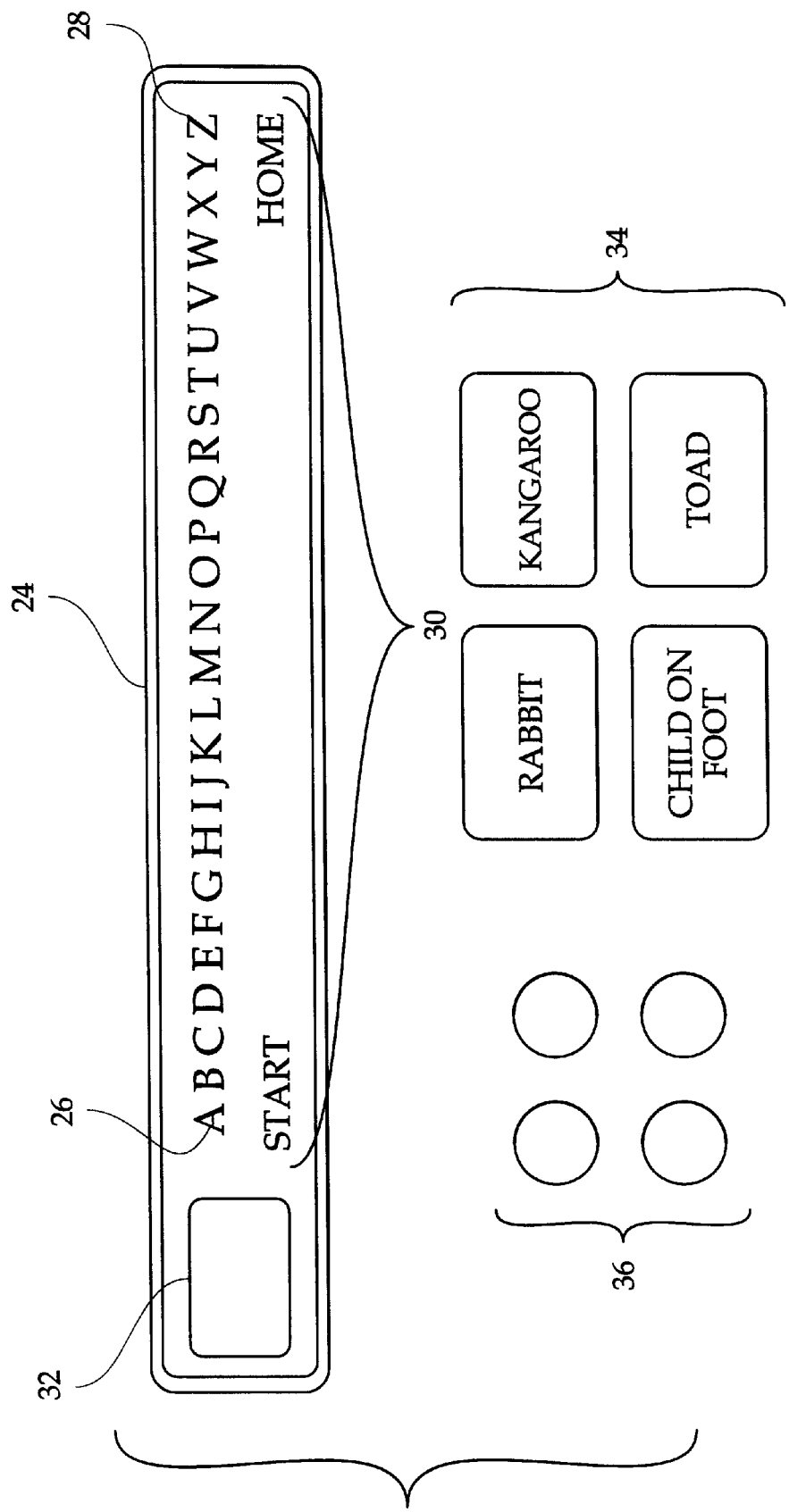
FIG. 3 is a plan view of the second game board, playing pieces, and question cards of the present invention.
Figure 4:
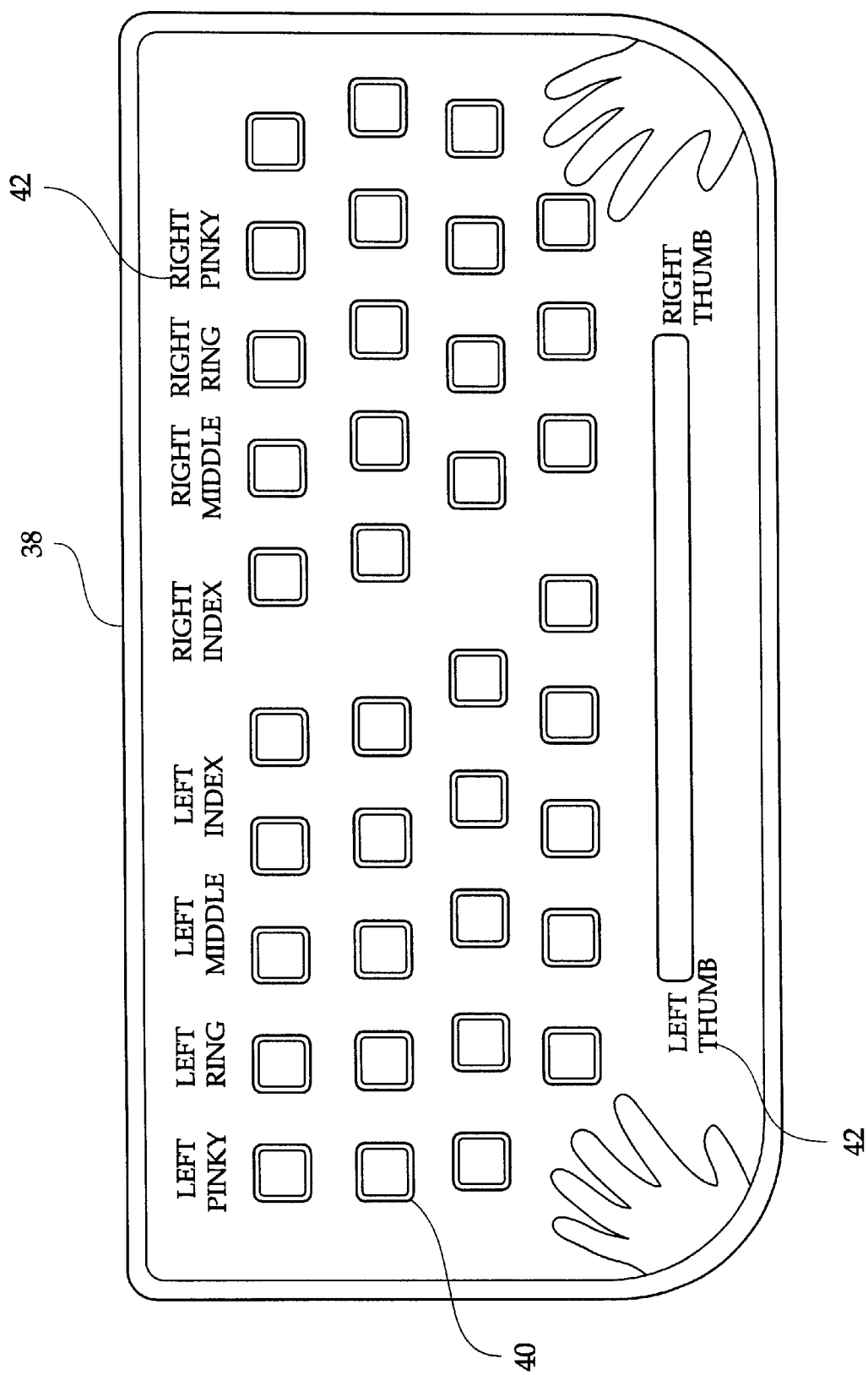
FIG. 4 is a plan view of an alternate embodiment of the present invention.

The plurality of groupings of spelling cards 34 are positionable on the question card marker 32 of the second game board 24. The spelling cards 34 each have a category. FIG. 3 illustrates typical categories of rabbit, kangaroo, toad, and child on foot. The category includes related words to be spelled. The grouping of spelling cards 34 is each marked with a color to correspond with the color of the numbers 6 through 9 on the spinning wheel 14.

The plurality of tokens 36 which represent players for movement along the path of travel of the second game board 24. The tokens 36 could be shaped in the form of animals or the like. The tokens 36 are also preferably transparent to allow the path of travel to be properly visualized.

Additionally, the present invention could be provided with a third game board 38 for use with more advanced players. The third game board 38 would be positioned over the upper surface of the first game board 12. The third game board 38 could be simply an overlay or could be secured via a temporary securement means, such as hook and loop fasteners or snap fasteners. The third game board 38 has a computer keyboard 40 printed thereon. The third game board 38 has finger locations 42 printed thereon corresponding with the keyboard 40 to indicate a proper finger of the player to be used on a specific key on the keyboard 40.

The object of the game is to become the first player to "hop" from "A to Z" on the second game board 24. If a player's spinner lands on a number between 1 and 5, he moves his token 36 that many spaces toward the letter "Z" on the second game board 24. When the spinner lands on a number between 6 and 9 he must pick a card 34 of matching color and turn the first game board 12 toward them. The player must use both hands to "write" the word from his card using the keyboard 18. He must find and touch the letters on the keyboard 18 from the appropriate side, without crossing the center of the keyboard 18. If he "writes" the word correctly, he advances three letters towards "Z". If the player makes a mistake, he is not allowed to advance if one of the opposing players notices. If the mistake goes unnoticed, the player advances the three spaces. The first player to reach "Z"is the winner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A board game, for teaching letter locations on a keyboard for allowing a child to learn the positioning of letters on a QWERTY keyboard comprising, in combination:

a first game board having a generally square configuration, the first game board having an upper surface and a lower surface, the upper surface having a spinning wheel disposed thereon, the upper surface having a computer keyboard printed thereon, the upper surface having a pair of hand placement markers disposed thereon adjacent to the computer keyboard, the lower surface having a rotatable base secured thereto;

a second game board having a generally rectangular configuration, the second game board having a path of travel thereon, the path of travel being defined by a starting location, a finishing location, and a plurality of spaces therebetween, the plurality of spaces being represented by letters of the alphabet in order, the starting location being next to the letter "A" and the finishing location being next to the letter "Z", the second game board having a question card marker thereon;

a plurality of groupings of spelling cards positionable on the question card marker of the second game board, the spelling cards each having a category; and a plurality of tokens representing players for movement along the path of travel of the second game board.

2. The board game as set forth in claim 1, and further including a third game board for positioning over the upper surface of the first game board for advanced players, the third game board having a computer keyboard printed thereon, the third game board having finger locations printed thereon corresponding with the keyboard to indicate a proper finger to be used on a specific key on the keyboard.

* * * * *